United States Patent [19]

Okita et al.

[11] Patent Number: 4,710,684
[45] Date of Patent: Dec. 1, 1987

[54] DRIVE CIRCUIT FOR BRUSHLESS DC MOTORS

[75] Inventors: Masaya Okita, Yokohama; Masahiro Sawada; Tadashi Ota, both of Tokyo, all of Japan

[73] Assignee: Nippon Kogaku K.K., Tokyo, Japan

[21] Appl. No.: 660,503

[22] Filed: Oct. 12, 1984

[30] Foreign Application Priority Data

Oct. 14, 1983 [JP] Japan .................. 58-190862

[51] Int. Cl.$^4$ .......................................... H02P 6/02
[52] U.S. Cl. ................................. 318/254; 318/138
[58] Field of Search ............... 318/138, 254, 254 A, 318/257, 293, 439, 345 R; 363/127

[56] References Cited

U.S. PATENT DOCUMENTS

| | | | |
|---|---|---|---|
| 4,135,120 | 1/1979 | Hoshimi et al. | 318/138 |
| 4,325,095 | 4/1982 | Hart | 361/23 |
| 4,376,261 | 3/1983 | Heide et al. | 318/138 X |
| 4,403,174 | 9/1983 | Miyazaki et al. | 318/254 |
| 4,438,377 | 3/1984 | Sakai et al. | 318/254 |
| 4,447,768 | 5/1984 | Terui | 318/293 |
| 4,454,454 | 6/1984 | Valentine | 318/257 X |
| 4,481,452 | 11/1984 | Kitano et al. | 318/293 X |
| 4,494,051 | 1/1985 | Bailey | 318/254 |

FOREIGN PATENT DOCUMENTS 2719200 11/1978 Fed. Rep. of Germany ... 318/345 R
2938928 4/1981 Fed. Rep. of Germany ...... 318/563

OTHER PUBLICATIONS

"Motor Control Having BEMF Dynamic Braking", IBM Technical Disclosure Bulletin, vol. 14, No. 2, Jul. 1971, p. 384.

Primary Examiner—William M. Shoop, Jr.
Assistant Examiner—Bentsu Ro
Attorney, Agent, or Firm—Michael N. Meller

[57] ABSTRACT

A drive circuit for a brushless DC motor capable of generating a torque in the acceleration and deceleration directions, respectively, and effective when used in a portable device such as an electronic still picture camera. In the drive circuit, a power amplifier having an output stage composed of a pair of complementarily connected tansistors is connected to each end of each of the stator coils. Thus, the drive circuit controls the input potentials of the power amplifiers so as to produce a potential difference across the terminals of each of the stator coils and thereby control the magnitude and direction of current flow through the stator coils. Also, all the transistors of the power amplifier output stages are cut off to prevent the flow of current through the stator coils.

10 Claims, 6 Drawing Figures

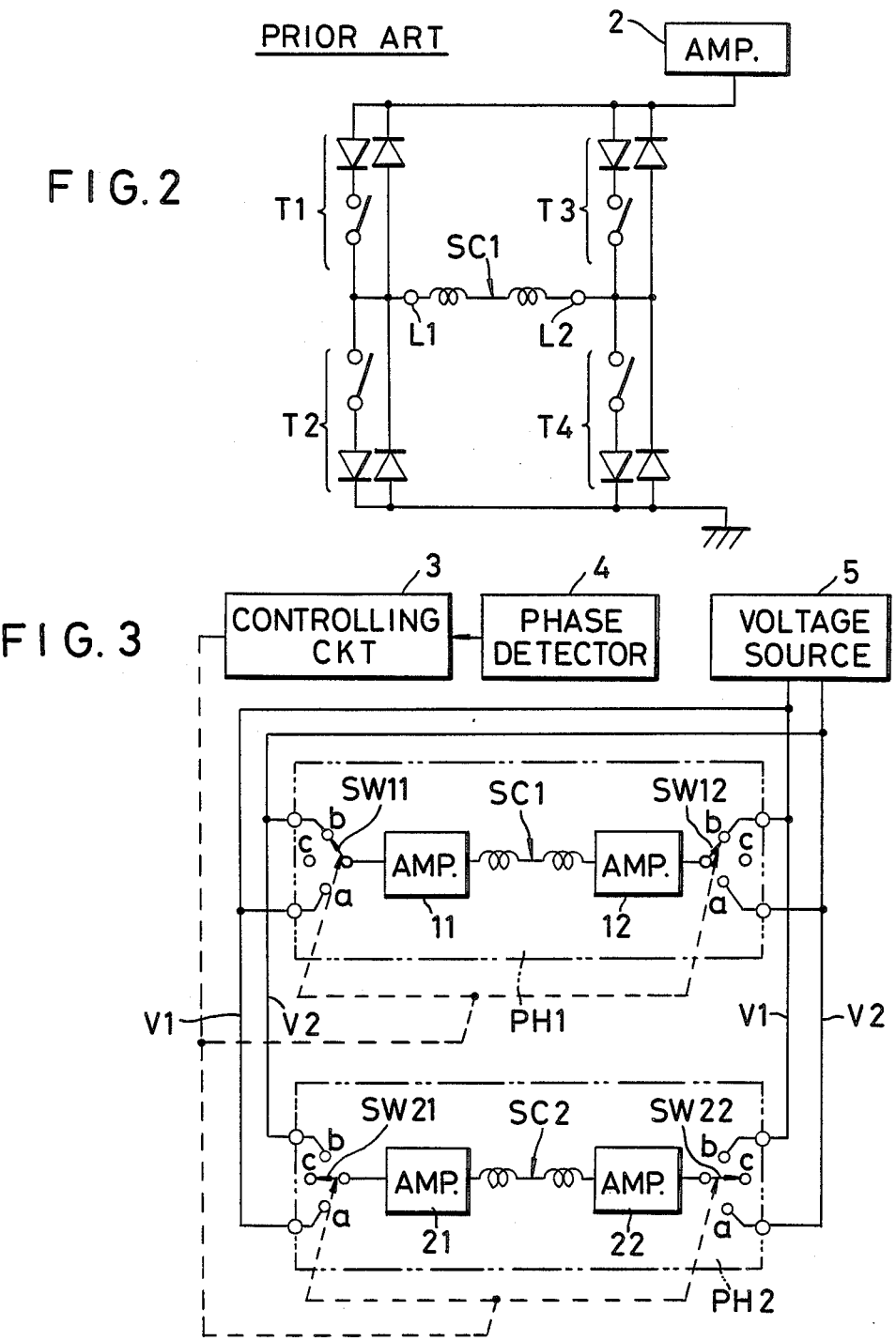

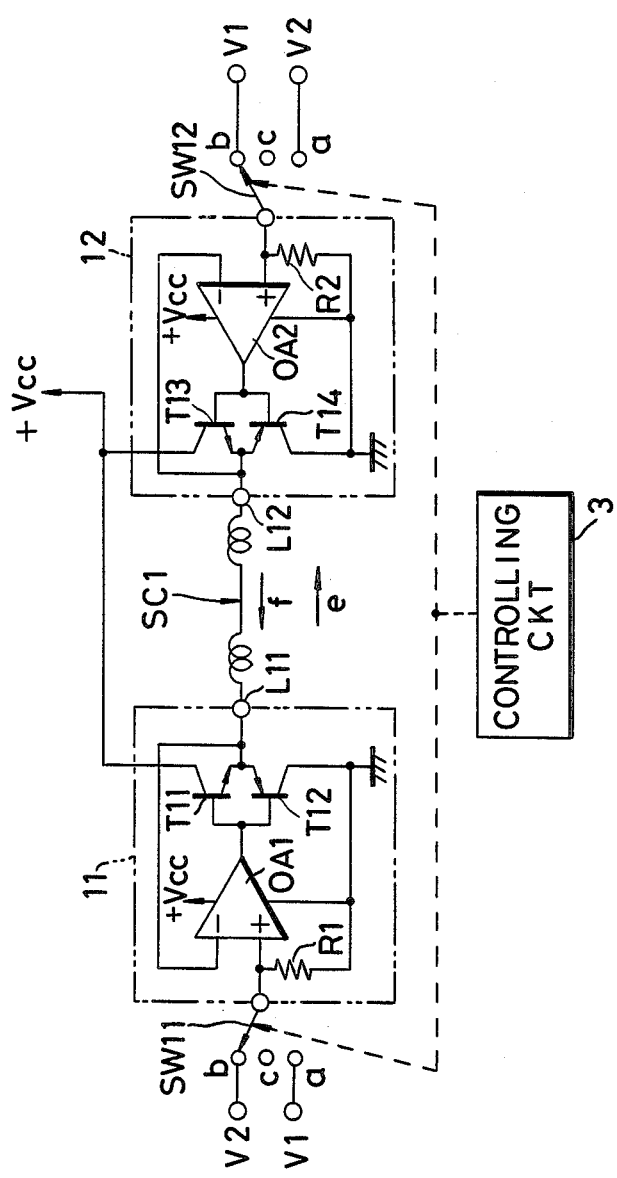
F I G. 4

DRIVE CIRCUIT FOR BRUSHLESS DC MOTORS

BACKGROUND OF THE INVENTION

1. Field of the Invention

The present invention relates to a drive circuit for brushless DC motors.

2. Description of the Prior Art

Since no brush is employed, DC brushless motors are advantageous in many ways over brush-type DC motors in that durability is increased, and motor thickness is decreased by an amount corresponding to the use of brushes thus making it easier to form the motor into a flat shape. Brushless DC motors are widely used in such applications as floppy disc drives, VTR, etc., where the increased durability and the thinner shape are required.

However, the brushless DC motor is greater in inertia than the brush-type DC motor and also the conventional brushless DC motor drive circuit employs switching elements such as transistors in place of the brushes with the result that the reverse rotation cannot be satisfactorily effected by simply reversing the polarity of the motor terminal voltage as in the case of the brush-type DC motor.

In this case, the switching operation by the transistors is a unidirectional switching and therefore the timing of the switching must be changed to effect the reverse rotation, thus making the control circuit very complicated. While the desired bidirectional switching can of course be accomplished with the use of specially designed transistors or FETs, this also gives rise to various problems such as the increased cost, the difficulty in using ICs, the need to use a bipolar power source, etc.

Also, where the brushless DC motor is subjected to servo control, if an external torque is applied in a direction to accelerate the motor, it is impossible to supply the current in the reverse direction with a simple construction and thus it is difficult to suppress the occurrence of irregular rotation due to the external torque in the acceleration direction.

Furthermore, recently the marketing of small electronic still picture cameras incorporating recording means consisting of a magnetic disk has been investigated and also portable cassette tape players have been placed on the market. With these devices, it is desirable to use a brushless DC motor for the purpose of increasing the durability and decreasing the size of the device. However, due to the facts that the electronic still picture camera is held by one hand and used to make a follow shot and the like, that a large acceleration is imparted to the tape player causing a disturbance torque which is much greater than in the case of the floppy disk drive, VTR, etc., and that the disturbance torque also acts in the acceleration direction, the conventional drive circuit is not suitable since it is difficult to control the irregular rotation due to the disturbance torque in the acceleration direction.

FIG. 1 is a circuit diagram of a conventional brushless DC motor drive circuit. The Figure shows by way of example the drive circuit for a 6-pole, 2-phase brushless DC motor.

The rotational angular position of a rotor ROT is detected by Hall effect elements $H_1$ and $H_2$ which are arranged to provide a phase difference of 90 degrees in terms of an electrical angle. Stator coils $SC_1$ and $SC_2$ are wound on the stator and terminals $L_1$, $L_2$, $L_3$ and $L_4$ of these coils are each connected through two of switching transistors $T_1$ to $T_8$ to a controlling circuit 1 and the switching of the transistors $T_1$ to $T_8$ is controlled in accordance with the outputs of the Hall effect elements $H_1$ and $H_2$ (the angular position of the rotor ROT). It is constructed so that the transistors $T_1$ to $T_8$ are supplied with current through a single power amplifier 2.

Now noting the four transistors $T_1$ to $T_4$ associated with the stator coil $SC_1$, a potential difference of $+V_{cc}$ is produced between the terminals $L_1$ and $L_2$ when the transistors $T_1$ and $T_4$ are turned on and the transistors $T_2$ and $T_3$ are turned off and a potential difference of $-V_{cc}$ is produced between the terminals $L_1$ and $L_2$ when the transistors $T_2$ and $T_3$ are turned on and the transistors $T_1$ and $T_4$ are turned off. Also, when the four transistors $T_1$ to $T_4$ are all turned off, an open condition is produced between the terminals $L_1$ and $L_2$.

FIG. 2 shows an equivalent circuit of the drive circuit in the above-mentioned condition. As will be seen from the equivalent circuit, each of the transistors is equivalent to a switch connected in series with a diode.

However, if the working voltage of the motor is low, the diode is rendered in operable due to its dead zone and in fact there results the same condition as if the diode were not connected. Therefore, when the transistors $T_1$ and $T_4$ are on, for example, it is possible to effect the current flow only in a direction from the terminal $L_1$ toward the terminal $L_2$, thus failing to produce a reverse torque in the rotor ROT. While it is of course possible to produce the desired reverse torque through the controlling circuit, this complicates the controlling circuit. As a result, it is in fact very difficult to overcome any irregular rotation due to the disturbance torque in the acceleration direction only with the use of the ordinary servo circuit. Thus, it is conceivable to provide, for example, a separate brake unit utilizing mechanical friction and in this case the drive mechanism on the whole is also complicated due to the use of the separate unit.

SUMMARY OF THE INVENTION

It is the primary object of the present invention to provide a drive circuit for brushless DC motors which is capable of preventing the occurrence of irregular rotation due to an acceleration torque caused by a disturbance, controlling the switching between the forward and reverse rotations simply through the control of the input voltage to the brushless DC motor, and operating at a low voltage.

Thus, a drive circuit according to the invention is so constructed that two power amplifiers each having an output stage composed of a transistor complementary symmetry circuit are connected to each of the stator coils of a brushless DC motor whereby the potential difference between the power amplifier outputs is applied to each stator coil and the output stage transistors of the two power amplifiers are cut off to open each stator coil. CL BRIEF DESCRIPTION OF THE DRAWINGS FIG. 1 is a circuit diagram of a prior art drive circuit for brushless DC motors.

FIG. 2 is an equivalent circuit for a principal part of the circuit of FIG. 1.

FIG. 3 is a block diagram showing the construction of an embodiment of a drive circuit according to the invention.

FIG. 4 is a circuit diagram showing an embodiment of the power amplifiers in FIG. 3.

DESCRIPTION OF THE PREFERRED EMBODIMENTS

Figure 1:
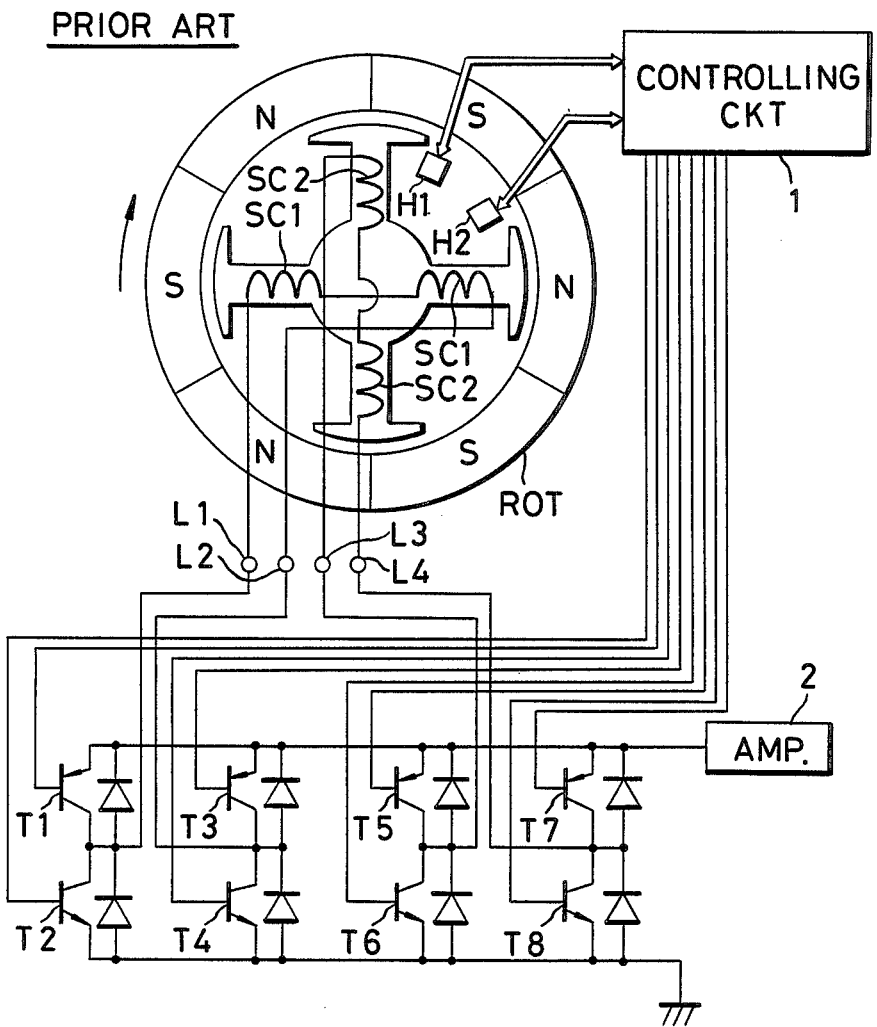

Referring to FIG. 3, there is illustrated a block diagram showing the construction of an embodiment of a drive circuit according to the invention. In the Figure, drivers $PH_1$ and $PH_2$ for stator coils $SC_1$ and $SC_2$, respectively, are identical in circuit construction. In the driver $PH_1$, each of power amplifiers 11 and 12 includes an output stage having a transistor buffer composed of a complementary symmetry circuit and the ends of the stator coil $SC_1$ are connected between the power amplifiers 11 and 12. Two input analog switches $SW_{11}$ and $SW_{12}$ are respectively connected to the inputs of the power amplifiers 11 and 12. While, as a matter of course, each of the switches $SW_{11}$ and $SW_{22}$ is in fact composed of a semiconductor switching circuit, in the Figure each switch is shown schematically as a mechanical switch.

In the driver $PH_2$, switches $SW_{21}$ and $SW_{22}$ respectively correspond to the switches $SW_{11}$ and $SW_{12}$ and also power amplifiers 21 and 22 respectively correspond to the power amplifiers 11 and 12. Each of the switches $SW_{11}$, $SW_{12}$, $SW_{21}$, $SW_{22}$ is selectively connected to contacts a, b and c in response to the output signal of a controlling circuit 3. The contacts a of the switches $SW_{11}$ and $SW_{21}$ are each connected to a terminal supplied with a voltage $V_1$ of a voltage source 5 and the contacts b of the switches $SW_{11}$ and $SW_{21}$ are each connected to a terminal supplied with a voltage $V_2$ of the voltage source 5. A phase detector 4 includes Hall effect elements or the like for detecting the rotational angular position of the signal indicative of rotor and it supplies a rotor position to the controlling circuit 3. It is to be noted that when the driver $PH_1$ is connected to the contacts a or b, thus supplying current to the stator coil $SC_1$, the driver $PH_2$ is connected to the contacts c and the stator coil $SC_1$ is opened. When the driver $PH_1$ is connected to the contacts a or b, the driver $PH_2$ is connected to the contact c.

FIG. 4 is a circuit diagram showing in greater detail the driver $PH_1$. In this circuit, the power amplifier 11 includes an operational amplifier $OA_1$ which receives the signal from the switch $SW_{11}$ at one input terminal (+) and the signal from complementarily connected output transistors $T_{11}$ and $T_{12}$ at the other input terminal (−). Similarly, the power amplifier 12 includes an operational amplifier $OA_2$ and transistors $T_{13}$ and $T_{14}$.

Then, in the condition where the switches $SW_{11}$ and $SW_{12}$ are connected to the contacts b by the signal from the controlling circuit 3 as shown in FIG. 4, the output of the power amplifier 11 becomes the voltage $V_2$ and the output of the power amplifier 12 becomes the voltage $V_1$, thereby producing the potential difference $V_2 - V_1$ across the terminals $L_{11}$ and $L_{12}$ of the stator coil $SC_1$. On the contrary, in the condition where the switches $SW_{11}$ and $SW_{12}$ are both connected to the contacts a, the output of the power amplifier 11 becomes the voltage $V_1$ and the output of the power amplifier 12 becomes the voltage $V_2$, thus producing the potential difference $V_1 - V_2$ across the terminals $L_{11}$ and $L_{12}$ of the stator coil $SC_1$. In this case, the complementarily connected transistors of the output stages of the power amplifiers 11 and 12 are connected as shown in FIG. 4 so that when the switches $SW_{11}$ and $SW_{12}$ are respectively connected to the contacts a and b, currents flow oppositely through the stator coil $SC_1$ as shown by arrows e and f.

On the other hand, where the switches $SW_{11}$ and $SW_{12}$ are connected to the contacts c, the noninverting inputs of the operational amplifiers $OA_1$ and $OA_2$ are respectively reduced to the ground level through resistors $R_1$ and $R_2$ so that the transistors of the output stages are cut off and no current flows through the stator coil $SC_1$. Thus, in this condition the stator coil $SC_1$ is open.

By thus controlling the connections of the switches $SW_{11}$ and $SW_{12}$ in accordance with the output of the controlling circuit 3, the direction of current flowing through the stator coil $SC_1$ is changed or the stator coil $SC_1$ is made open. Also, instead of controlling the connections of the switches $SW_{11}$ and $SW_{12}$, at least one of the voltages $V_1$ and $V_2$ of the voltage source 5 may be changed so as to control the value of current flowing through the stator coil $SC_1$.

Thus, by for example maintaining one of the voltages $V_1$ and $V_2$ constant at such a value which would not cut off the transistors and using the other voltage as a servo control voltage, it is possible to control the rotational speed of the motor. In this case, the input impedance to the servo control voltage is so high that there is no need to include any power amplifier in the output stage of the servo control circuit.

Figure 5:
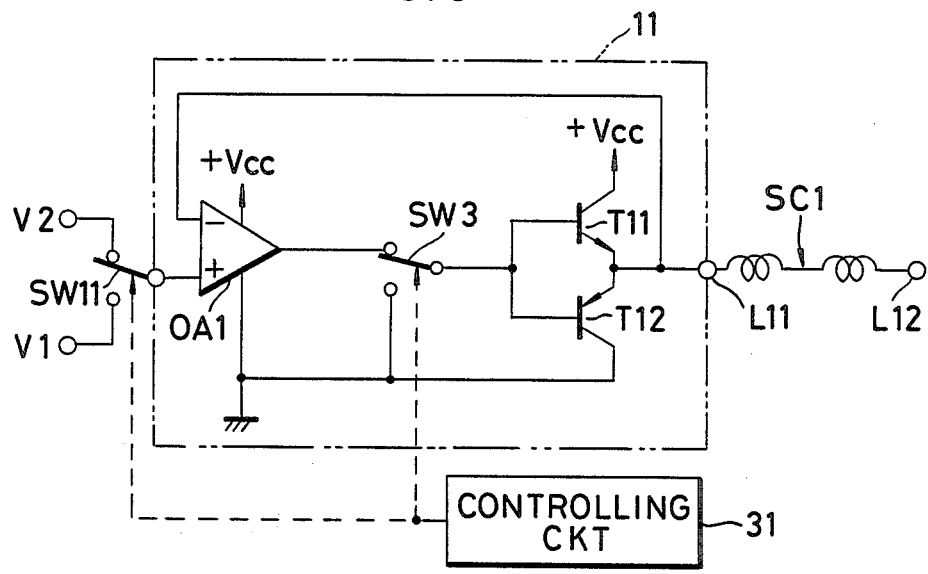
FIGS. 5 and 6 are circuit diagrams showing other embodiments of the power amplifiers.

Also, instead of switching the switches $SW_{11}$ and $SW_{12}$ between the contacts a and b, it is possible to change the direction of rotation of the motor by permanently connecting each of the switches to either of the two contacts and changing the polarity of the difference between the voltages $V_1$ and $V_2$. For example, this can be achieved by setting $V_2 = V_{cc} - V_1$ so that the motor is rotated in the forward direction when $V_1 > V_{cc}/2$, then the motor can be stopped when $V_1 = V_{cc}/2$ and rotated in the reverse direction when $V_1 < V_{cc}/2$. Here, $V_{cc}$ represents the power supply voltage for the power amplifiers 11 and 12. It is to be noted that the transistors forming the output stage of each power amplifier may be replaced with a field effect transistor. Also the operational amplifiers used in this embodiment are of the type in which if the potential of the noninverting input terminal (+) is set to the ground level, the output potential is also held at the ground level, thus preventing the device from operating as an amplifier.

Where operational amplifiers of any other type are used, it is only necessary to directly control the base potential of the output stage transistors at a cut-off potential. For example, the circuit shown in FIG. 5 may be used. FIG. 5 shows only a power amplifier 11 and the other power amplifier 12 is omitted. In FIG. 5, the same reference numerals as used in FIG. 4 designate the equivalent components and will not be described. In the present embodiment, an analog switch $SW_3$ connected to the output of the operational amplifier $OA_1$ is switched between its contacts by a controlling circuit 31 so that the base potential of the transistors $T_{11}$ and $T_{12}$ is held at the ground level and the power amplifier 11 is effectively disconnected from the stator coil $SC_1$. Of course, the power amplifier 12 is the same in construction as the power amplifier 11 so that the stator coil $SC_1$ is also effectively disconnected from the power amplifier 12 and thus no current flows through the stator coil $SC_1$.

Figure 6:
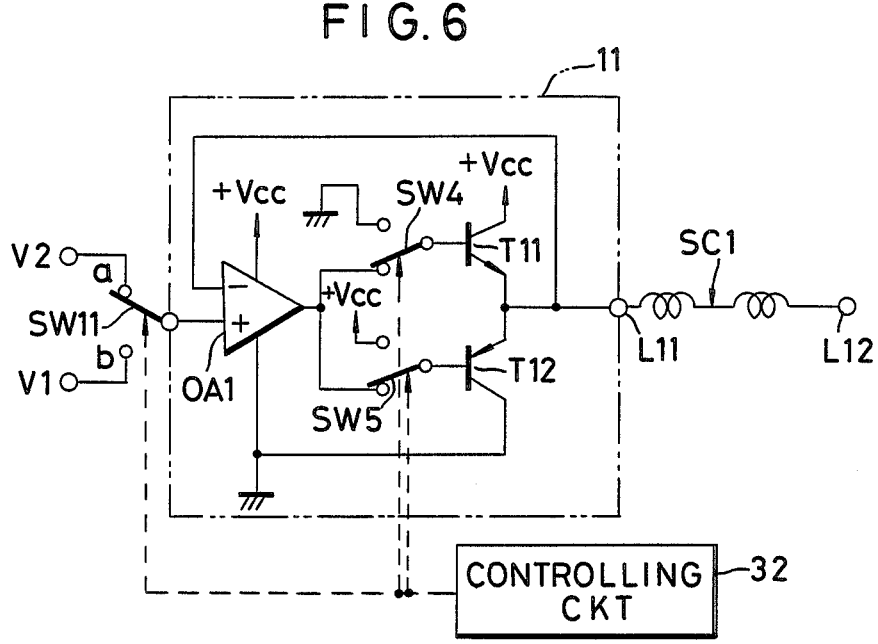

FIG. 6 is a modification of the circuit shown in FIG. 5 in which the dead zone of the transistors $T_{11}$ and $T_{12}$ is increased and the power amplifier 12 is omitted as in the case of FIG. 5. In the present embodiment the dead zone is increased to $V_{cc}+1.4$ V as compared with the dead zone of 1.4 V in the circuit of FIG. 5. The same reference numerals as used in FIG. 5 designate the equivalent components and they will not be described. This embodiment is constructed so that in order to disconnect the stator coil $SC_1$ from the power amplifier 11, the positions of analog switches $SW_4$ and $SW_5$ connected to the output of the operational amplifier $OA_1$ are changed by a controlling circuit 32 so that the ground potential is applied to the base of the transistor $T_{11}$ and the power supply voltage $V_{cc}$ is applied to the base of the transistor $T_{12}$. This is the same with the power amplifier 12, thus also disconnecting the stator coil $SC_1$ from the power amplifier 12, thereby supplying no current to the stator coil $SC_1$. It is to be noted that in all of the above-described embodiments the input voltages of the four power amplifiers can be controlled at the same voltage within a range of voltages at which the power amplifiers are properly operable, thereby rapidly stopping the motor.

What is claimed is:

1. A drive circuit for a brushless DC motor for controlling the flow of current between terminals of each stator coil of said motor, said drive circuit including voltage application means provided for each of said stator coils so as to apply a voltage across the terminals thereof, said voltage application means comprising:
    (a) a first complementary symmetry circuit having an input terminal and an output terminal, said output terminal being connected to one of the terminals of said stator coil, said first complementary symmetry circuit including first and second transistors having different polarities, means for connecting a base of said first transistor with a base of said second transistor and means for connecting an emitter of said first transistor with an emitter of said second transistor,
    (b) a second complementary symmetry circuit having an input terminal and an output terminal connected to the other terminal of said stator coil, said second complementary symmetry circuit including third and fourth transistors having different polarities, means for connecting a base of said third transistor with a base of said fourth transistor and means for connecting an emitter of said third transistor and an emitter of said fourth transistor,
    (c) switch means for turning off all the transistors in said first and second complementary symmetry circuits,
    (d) a first operational amplifier having an inverting input terminal, a noninverting input terminal and an output terminal connected to the input terminal of said first complementary symmetry circuit,
    (e) means forming a negative feedback loop between said first operational amplifier and said first complementary symmetry circuit,
    (f) first control means for controlling the potential at the noninverting input terminal of said first operational amplifier,
    (g) a second operational amplifier having an inverting input terminal, a noninverting input terminal and an output terminal connected to the input terminal of said second complementary symmetry circuit,
    (h) means forming a negative feedback loop between said second operational amplifier and said second complementary symmetry circuit, and
    (i) second control means for controlling the potential at the noninverting input terminal of said second operational amplifier,
    wherein said switch means includes means for maintaining the input terminals of said first and second complementary symmetry circuits at the same potential.

2. A drive circuit according to claim 1, wherein said maintaining means includes first means for causing the potential of the noninverting input of said first operational amplifier to become substantially equal to the potential of one of collectors of said first and second transistors and second means for causing the potential of the noninverting input of said second operational amplifier to become substantially equal to the potential of one of collectors of said third and fourth transistors.

3. A drive circuit according to claim 2, wherein said first operational amplifier causes the potential of the connection of the base of said first and second transistors to become substantially equal to the potential of the collector of one of said first and second transistors in response to said first means and said second operational amplifier causes the potential of the connection of the base of said third and fourth transistors to become substantially equal to the potential of the collector of one of said third and fourth transistors in response to said second means.

4. A drive circuit according to claim 3, wherein the potential of said one of said collectors of said first and second transistors is substantially equal to the potential of said one of said collectors of said third and fourth transistors.

5. A drive circuit for a brushless DC motor for controlling the flow of current between terminals of each stator coil of said motor, said drive circuit including voltage application means provided for each of said stator coils so as to apply a voltage across the terminals thereof, said voltage application means comprising:
    (a) a first complementary symmetry circuit having an input terminal and an output terminal, said output terminal being connected to one of the terminals of said stator coil, said first complementary symmetry circuit including first and second semiconductor means having different polarities, each of said first and second semiconductor means having an emitting terminal, a control terminal and a collecting terminal, the emitting terminals of said first and second semiconductor means being connected with each other, and the control terminal of said first and second semiconductor means being connected with each other;
    (b) a second complementary symmetry circuit having an input terminal and an output terminal connected to the other terminal of said stator coil, said second complementary symmetry circuit including third and fourth semiconductor means having different polarities, each of said third and fourth semiconductor means having an emitting terminal, a control terminal and a collecting terminal, the emitting terminals of said third and fourth semiconductor means being connected with each other, and the control terminals of said second and fourth semiconductor means being connected with each other, each of said first, second, third and fourth semiconductor means controlling the current flowing between the collecting terminal and the emitting terminal in dependence on the current flowing between the control terminal and the emitting terminal;

(c) switch means for turning off said first, second, third and fourth semiconductor means;

(d) a first operational amplifier having an inverting input terminal, a noninverting input terminal and an output terminal connected to the input terminal of said first complementary symmetry circuit, (e) means for forming a negative feedback loop between said first operational amplifier and said first complementary symmetry circuit;

(f) first control means for controlling the potential at the noninverting input terminal of said first operational amplifier;

(g) a second operational amplifier having an inverting input terminal, a noninverting input terminal and an output terminal connected to the input terminal of said second complementary symmetry circuit;

(h) means for forming a negative feedback loop between said second operational amplifier and said second complementary symmetry circuit, and (i) second control means for controlling the potential at the noninverting input terminal of said second operational amplifier, wherein said switch means includes means for maintaining the input terminals of said first and second complementary symmetry circuits at the same potential.

6. A drive circuit according to claim 5, wherein said maintaining means includes first means for causing the potential of the noninverting input of said first operational amplifier to become substantially equal to the potential of one of said collecting terminals of said first and second semiconductor means and second means for causing the potential of the noninverting input of said second operational amplifier to become substantially equal to the potential of one of said collecting terminals of said third and fourth semiconductor means.

7. A drive circuit according to claim 6, wherein said first operational amplifier causes the potential of the connection of said control terminals of said first and second semiconductor means to become substantially equal to the potential of one of said collecting terminals of said first and second semiconductor means in response to said first means and said second operational amplifier causes the potential of the connection of said control terminals of said third and fourth semiconductor means to become substantially equal to the potential of one of said collecting terminals of said third and fourth semiconductor means in response to said second means.

8. A drive circuit according to claim 7, wherein the potential of said one of said collecting terminals of said first and second semiconductor means is substantially equal to the potential of said one of said collecting terminals of said third and fourth semiconductor means.

9. A drive circuit for a brushless DC motor for controlling the flow of current between terminals of each stator coil of said motor, said drive circuit including voltage application means provided for each of said stator coils so as to apply a voltage across the terminals thereof, said voltage application means comprising:

(a) a first complementary symmetry circuit having an input terminal and an output terminal, said output terminal being connected to one of the terminals of said stator coil, said first complementary symmetry circuit including first and second transistors having different polarities means for connecting a base of said first transistor with a base of said second transistor and means for connecting an emitter of said first transistor with an emitter of said second transistor;

(b) a second complementary symmetry circuit having an input terminal and an output terminal connected to the other terminal of said stator coil, said second complementary symmetry circuit including third and fourth transistors having different polarities, means for connecting a base of said third transistor with a base of said fourth transistor and means for connecting an emitter of said third transistor with an emitter of said fourth transistor;

(c) switch means for turning off all the transistors in said first and second complementary symmetry circuits said switch means having first means and second means, said first means disconnecting the bases of said first and second transistors, causing the potential of the base of said first transistor to become substantially equal to the potential of the collector of said second transistor and causing the potential of the base of said second transistor to become substantially equal to the potential of the collector of said first transistor, said second means disconnecting the bases of said third and fourth transistors, causing the potential of the base of said third transistor to become substantially equal to the potential of the collector of said fourth transistor and causing the potential of the base of said fourth transistor to become substantially equal to the potential of the collector of said third transistor;

(d) a first operational amplifier having an inverting input terminal, a noninverting input terminal and an output terminal connected to the input terminal of said first complementary symmetry circuit;

(e) means for forming a negative feedback loop between said first operational amplifier and said first complementary symmetry circuit;

(f) first control means for controlling the potential at the noninverting input terminal of said first operational amplifier;

(g) a second operational amplifier having an inverting input terminal, a noninverting input terminal and an output terminal connected to the input terminal of said second complementary symmetry circuit;

(h) means for forming a negative feedback loop between said second operational amplifier and said second complementary symmetry circuit; and (i) second control means for controlling the potential at the noninverting input terminal of said second operational amplifier.

10. A drive circuit for a brushless DC motor for controlling the flow of current between terminals of each stator coil of said motor, said drive circuit including voltage application means provided for each of said stator coils so as to apply a voltage across the terminals thereof, said voltage application means comprising:

(a) a first complementary symmetry circuit having an input terminal and an output terminal, said output terminal being connected to one of the terminals of said stator coil, said first complementary symmetry circuit including first and second semiconductor means having different polarities, each of said first and second semiconductor means having an emitting terminal, a control terminal and a collecting terminal, the emitting terminals of said first and second semiconductor means being connected with each other, and the control terminals of said first and second semiconductor means being connected with each other;
(b) a second complementary symmetry circuit having an input terminal and an output terminal connected to the other terminal of said stator coil, said second complementary symmetry circuit including third and fourth semiconductor means having different polarities, each of said third and fourth semiconductor means having an emitting terminal, a control terminal and a collecting terminal, the emitting terminals of said third and fourth semiconductor means being connected with each other, and the control terminals of said third and fourth semiconductor means being connected with each other, each of said first, second, third and fourth semiconductor means controlling the current flowing between the collecting terminal and the emitting terminal in dependence on the current flowing between the control terminal and the emitting terminal;
(c) switch means for turning off said first, second, third and fourth semiconductor means, said switch means having first means and second means, said first means disconnecting the control terminals of said first and second semiconductor means, causing the potential of the control terminal of said first semiconductor means to become substantially equal to the potential of the collecting terminal of said second semiconductor means and causing the potential of the control terminal of said second semiconductor means to become substantially equal to the potential of the collecting terminal of said second semiconductor means and causing the potential of the control terminal of said second semiconductor means to become substantially equal to the potential of the collecting terminal of said first semiconductor means, said second means disconnecting the control terminals of said third and fourth semiconductor means, causing the potential of the control terminal of said third semiconductor means to become substantially equal to the potential of the collecting terminal of said fourth semiconductor means and causing the potential of the control terminal of said fourth semiconductor means to become substantially equal to the potential of the collecting terminal of said third semiconductor means;
(d) a first operational amplifier having an inverting input terminal, a noninverting input terminal and an output terminal connected to the input terminal of said first complementary symmetry circuit;
(e) means for forming a negative feedback loop between said first operational amplifier and said first complementary symmetry circuit;
(f) a first control means for controlling the potential at the noninverting input terminal of said first operational amplifier;
(g) a second operational amplifier having an inverting input terminal, a noninverting input terminal and an output terminal connected to the input terminal of said second complementary symmetry circuit;
(h) means for forming a negative feedback loop between said second operational amplifier and said second complementary symmetry circuit; and
(i) second control means for controlling the potential at the noninverting input terminal of said second operational amplifier.

* * * * *